United States Patent [19]

Sumi et al.

[11] 4,414,495

[45] Nov. 8, 1983

[54] SYNCHRONISM EQUIPMENT FOR GEAR CUTTING MACHINES

[75] Inventors: Masaoki Sumi; Tomoyuki Doi, both of Shiga, Japan

[73] Assignee: Kashifuji Works, Ltd., Kyoto, Japan

[21] Appl. No.: 315,417

[22] Filed: Oct. 27, 1981

[51] Int. Cl.³ .............................................. G05B 19/24
[52] U.S. Cl. ...................................... 318/571; 318/85; 318/625; 51/2 AA
[58] Field of Search .................. 318/39, 571, 85, 621, 318/625; 51/2 AA, 2 B

[56] References Cited

U.S. PATENT DOCUMENTS

| | | | |
|---|---|---|---|
| 3,267,344 | 8/1966 | McDaniel | 318/571 X |
| 3,725,651 | 4/1973 | Cutler | 318/571 |
| 4,253,050 | 2/1981 | Angst | 318/85 X |
| 4,267,495 | 5/1981 | Wilterdink | 318/39 X |
| 4,297,624 | 10/1981 | Komiya | 318/625 X |

Primary Examiner—B. Dobeck

[57] ABSTRACT

Apparatus for synchronizing the rotating cutter and rotating workpiece of a gear cutting machine, featuring, in one aspect, correcting synchronism errors due to the time lag between application of a command signal and a corresponding movement of the workpiece by delaying or advancing the command signal by an amount dependent on the time lag and, in another aspect, synchronizing circuits which process pulse-encoded measurements of cutter rotation and axial translation to provide a command signal for driving the workpiece.

14 Claims, 11 Drawing Figures

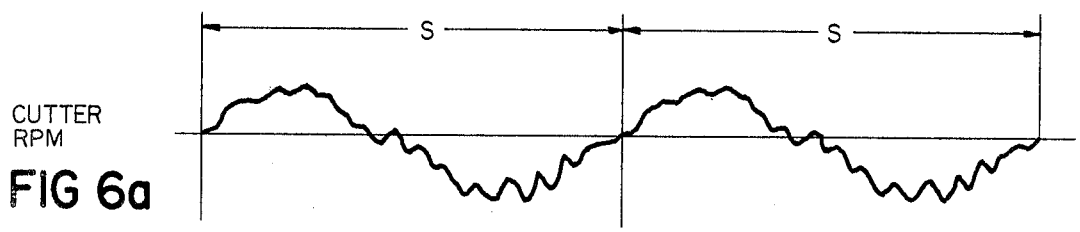
CUTTER RPM
FIG 6a
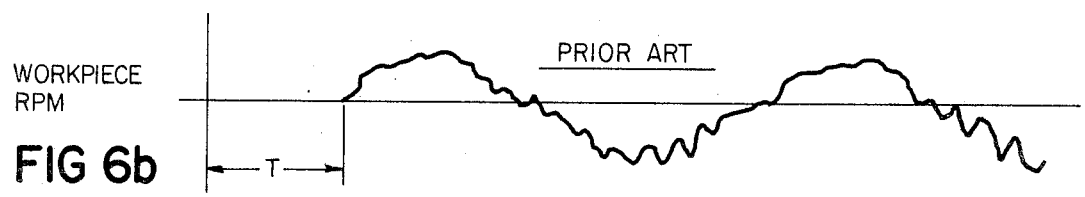
WORKPIECE RPM
PRIOR ART
FIG 6b
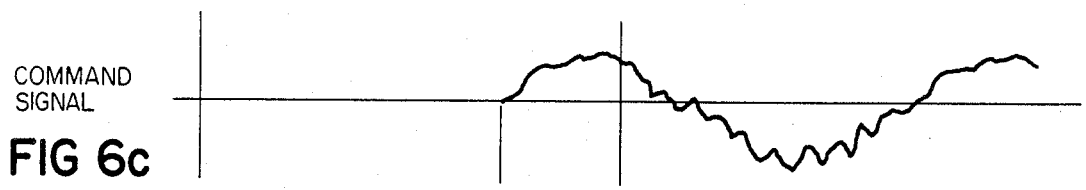
COMMAND SIGNAL
FIG 6c
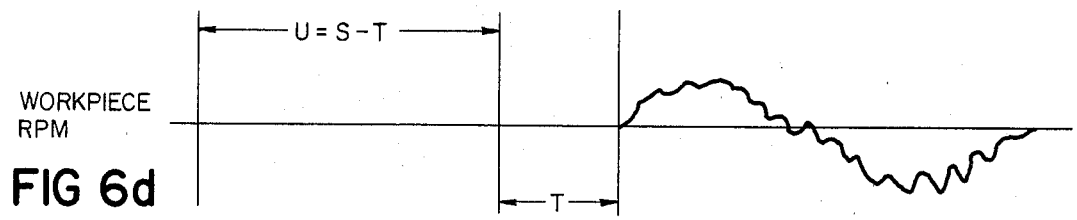
WORKPIECE RPM
FIG 6d
FIG 7
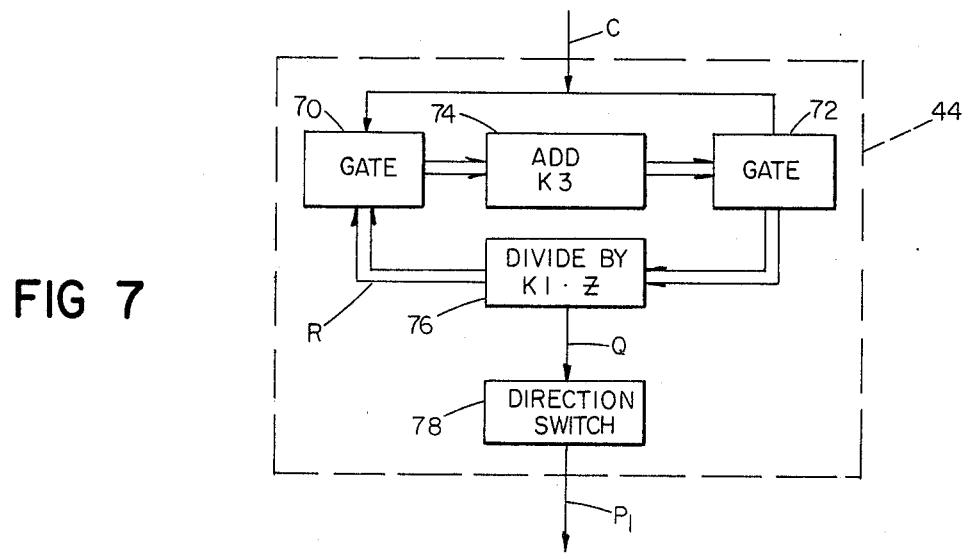

SYNCHRONISM EQUIPMENT FOR GEAR CUTTING MACHINES

FIELD OF THE INVENTION

This invention relates to synchronizing gear cutting machinery.

BACKGROUND OF THE INVENTION

In cutting gears, e.g., by the hobbing process, it is desirable to maintain synchronism between the cutter and the workpiece. Typically the workpiece must be rotated a fraction of a turn for each full turn of the cutter. If for some reason the workpiece rotates more or less than the desired fraction, the cutter will strike it at the wrong location, producing an imperfectly cut gear.

SUMMARY OF THE INVENTION

We have found a technique for improving synchronism between the cutter and workpiece. In a first aspect, the components of the command signal are delayed or advanced in time by an amount dependent upon an estimate of the lag time of the workpiece in responding to the command signal. In a second aspect, synchronizing circuits process pulse encoded measurements of cutter rotation and axial translation to provide a command signal for driving the workpiece.

It has been found that the lag of the workpiece in responding to command signals causes synchronism errors when cutter speed (RPM) or axial feed rate changes. For example, the gradual change in average cutter RPM during its pass across the workpiece, due to change in the degree of engagement between the two elements, produces a lead error in the finished gear. And fluctuations in cutter RPM during each revolution produce profile errors in the gear teeth.

In preferred embodiments, the delay or advance is also dependent upon variation in cutter RPM and upon variation in axial feed rate; the synchronizing circuits generate commandsignal components made up of pulses which are generated in a predetermined ratios to the frequencies of the pulse-encoded rotation and translation measurements; a pulse composer combines the pulse outputs of the synchronzing circuit; delay is provided by a delay circuit (e.g., a memory) which delays the rotation components of the command signal by a delay period such that the workpiece lags behind the cutter by one cutter revolution; the amount of delay is either updated throughout cutting so as to take into account variation in cutter RPM or is calculated once to provide an average delay; delay or advance is also provided by generating a further stream of pulses that advance or retard the command signal by an amount chosen to compensate for the effects of variation in cutter RPM and axial translation rate.

PREFERRED EMBODIMENT

The structure and operation of preferred embodiments of the invention will now be described, after first briefly describing the drawings.

DRAWINGS

FIG. 6a shows the fluctuation in cutter RPM during two revolutions.

FIG. 6b shows the resulting fluctuation in workpiece RPM in prior art machinery.

FIG. 6c shows a diagrammatic representation of the delayed command signal to the workpiece (the actual command signal is a stream of pulses).

FIG. 6d shows the resulting fluctuation in workpiece RPM, which is delayed by the period of one cutter revolution.

FIG. 7 is a block diagram of synchronizing circuit 44 of FIG. 1.

STRUCTURE

Figure 1:
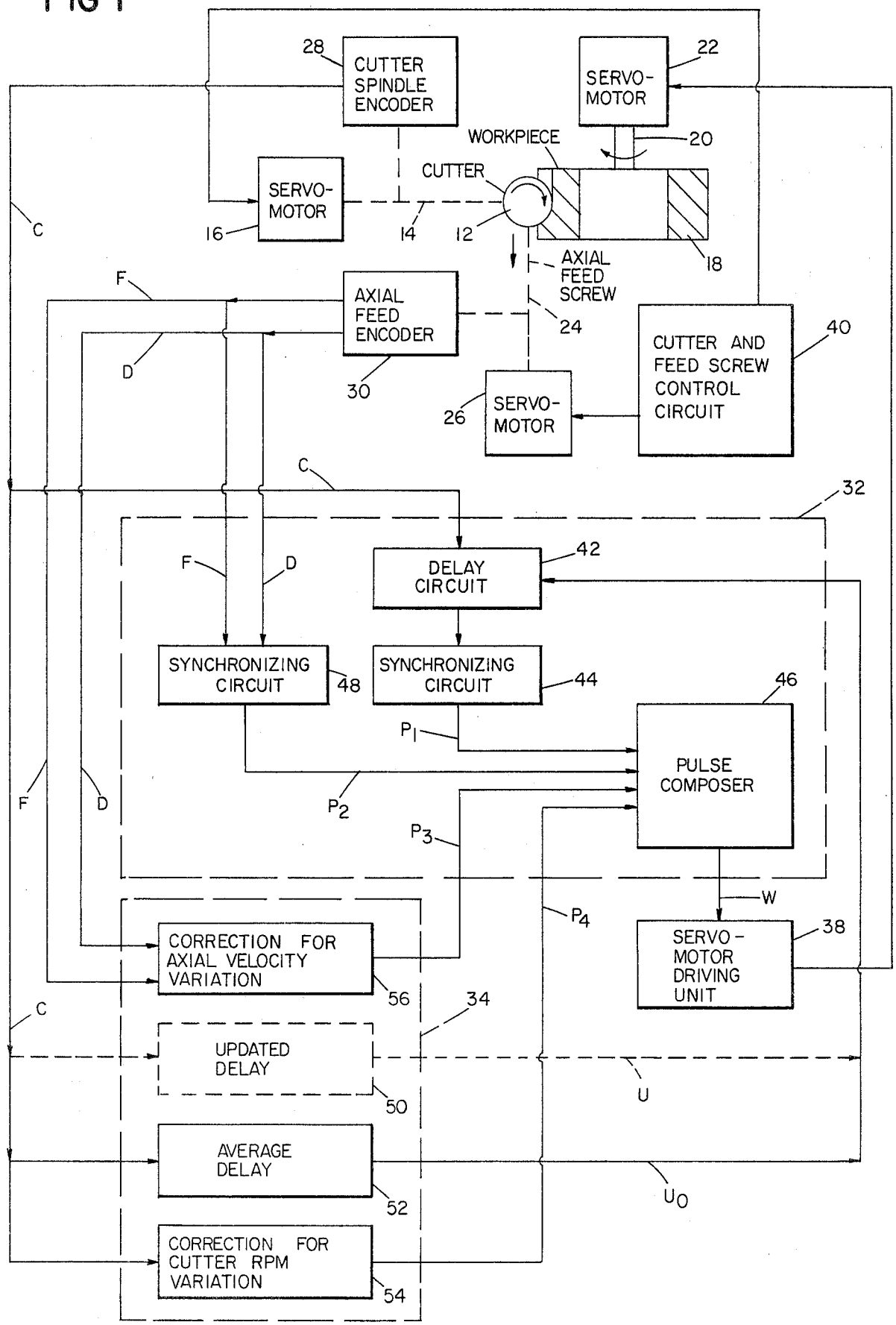
FIG. 1 is a diagrammatic view showing the moving elements of a gear hobbing machine—cutter, axial feed screw, and workpiece—and a block diagram showing the cutter control circuitry.

Turning to FIG. 1, there are shown the three moving elements of a gear hobbing machine: cutter (or hob) 12, which is mounted on cutter spindle 14 and driven by servomotor 16; workpiece 18, which is mounted on work spindle 20 and driven by servomotor 22; and axial feed screw 24, which is driven by servomotor 26.

Figure 2:
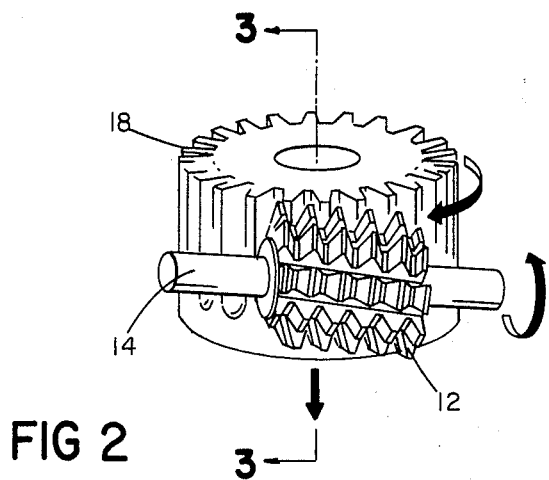
FIG. 2 is a perspective view, somewhat diagrammatic, of a cutter about midway through cutting teeth in a workpiece.

A more mechanically descriptive (but still somewhat diagrammatic) illustration of the cutter and workpiece is given in FIG. 2. The teeth of rotating cutter (or hob) 12 mesh with the teeth being cut in workpiece 18, and the cutter is translated axially along the workpiece.

Pulse encoders 28, 30 are coupled to cutter spindle 14 and feed screw 24, respectively. The encoders provide pulsed outputs C, F, in which each pulse represents a tiny incremental movement. Outputs C, F are supplied to control circuitry 32 and microcomputer 34, which work together to provide an output W to servomotor driving unit 38, which drives the workpiece servomotor 22. Another control circuit 40 independently controls cutter servomotor 16 and feed screw servomotor 26.

Cutter encoder output C is connected within control circuitry 32 to delay circuit 42, which has a memory large enough to temporarily store the pulses of output C for the delay time period U (or $U_0$) prescribed by microcomputer 34. The delayed output of circuit 42 is supplied to first synchronizing circuit 44 which is shown in more detail in FIG. 7. A pulse appearing in encoder output C opens gates 70, 72, causing division and addition operations to be performed in blocks 74, 76. Quotient output Q of division block 76 has its polarity established by direction switch 78, which is preset according to the direction of rotation of the workpiece. Residual output R, of division block 74 is supplied to gate 70 to be ready for the next pulse in output C. Addition block 76 adds residual R to constant K each time a pulse opens gate 70. Division block 74 divides the output of the addition block by a constant K1·Z each time gate 72 is opened. The net result of this addition and division is to produce a pulsed output $P_1$ which has K2 pulses for each pulse received in encoder output C (i.e., there is a predetermined ratio K2 of $P_1$ pulses to output C pulses), where K2 is given by the expression $$K2=(R+K3)/K1\cdot Z$$

K1 represents the number of pulses per revolution of cutter encoder 28, K3 represents the number of pulses required in command signal W to produce one revolution of workpiece 18, and Z is the number of turns of the cutter required to produce one turn of the workpiece. These three constants K1, K3, and Z are presupplied to the synchronizing circuit using thumb wheels or digital switches. The output $P_1$ of synchronizing circuit 44 is supplied to pulse composer 46, which composes from several inputs a pulse-stream output to control the workpiece.

When helical gears are being cut, a second synchronizing circuit 48 receives output F of the feed-screw encoder and provides another input $P_2$ for pulse composer 46. The feed screw synchronizing circuit and encoder are not needed for non-helical gears because even though these gears require feed screw motion to move the cutter across the workpiece, workpiece rotation can be independent of feed rate.

Synchronizer 48 operates in a similar manner to the first synchronizer 44, except the constants K1, Z are replaced by constants K4, X. K4 represents the number of pulses generated by axial encoder 30 for each millimeter of axial travel and X represents the lead of the helical gear being cut, i.e., the axial distance in millimeters corresponding to one revolution of the helix defining the gear teeth being cut into the workpiece. One other difference between the two synchronizing circuits is that the axial circuit 48 also receives axial direction input D, which is used to control a second direction switch (not shown in FIG. 7) which gives the correct polarity to output $P_2$.

Encoder outputs C, F, D are also supplied to microcomputer 34 which computes therefrom delay time U (or $U_0$) and further inputs $P_3$, $P_4$ for the pulse composer. In a first embodiment, software 50 processes cutter encoder output C to provide delay time U, which is updated during a cutting operation, and software 56 processes feed-screw encoder outputs F, D to generate input $P_3$ for the pulse composer 46. In a second embodiment, software 50 is replaced by software 52, which provides a fixed average delay time $U_0$ based on a pre-cutting sample of cutter encoder output C, and software 54 operates continuously on output C to provide input $P_4$ to the pulse composer 46.

OPERATION

For accurate cutting, the workpiece must rotate synchronously with the cutter and, when cutting helical gears, also synchronously with the feed screw. For non-helical gears, this typically means that, for each revolution of the cutter, the workpiece should rotate by precisely the distance between successive teeth, i.e., the pitch distance. For helical gears, the workpiece rotation must typically be equal to the pitch distance plus an increment that depends on the desired helix angle and the axial translation effected by the feed screw.

Synchronism errors can occur as the result of variations in cutter RPM and feed screw velocity, brought about as the result of variations in cutting load. The reason that speed variations result in synchronsim errors is related to the fact that the workpiece, because it is controlled by a servomotor, always lags behind its electrical command signal by an approximately constant delay period T. In terms of angular movement of the workpiece, that delay period T translates into an angular error equal to the angle swept out by the workpiece during the delay period, i.e., the workpiece lags behind its ideal position (which it would be at except for the lag) by some angular error. The size of this angular error depends on both the length of the delay period T and the instantaneous RPM of the workpiece. Because the workpiece RPM is always a prescribed fraction of the cutter RPM (as prescribed by synchronizing circuit 44), the angular error is actually a function of the delay period and the cutter RPM.

Such an angular error would be harmless if the cutter RPM remained constant, as that would mean the angular error would also remain constant (as the delay period is constant), meaning simply that all the teeth would be shifted around the circumference of the gear by the amount of the error. But variation in cutter RPM causes variation in this angular error, and thus variation in the circumferential location of the gear teeth.

Figure 4:
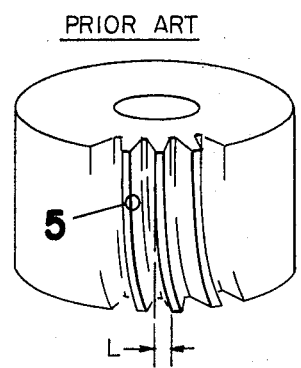
FIG. 4 is a diagrammatic view showing the lead error resulting with prior art machinery.
Figure 3A:
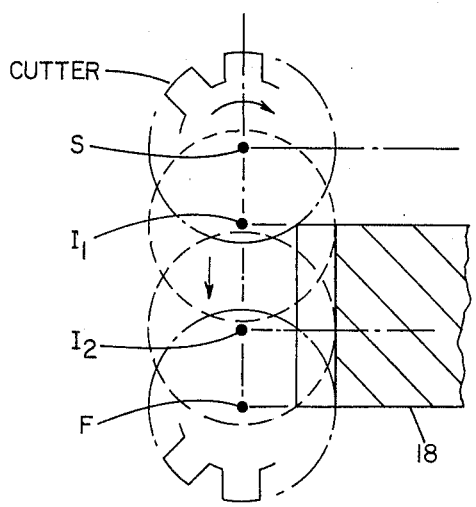
FIG. 3a is a diagrammatic sectional view at 3—3 of FIG. 2, showing the cutter at its starting and finishing locations on the workpiece.
Figure 3B:
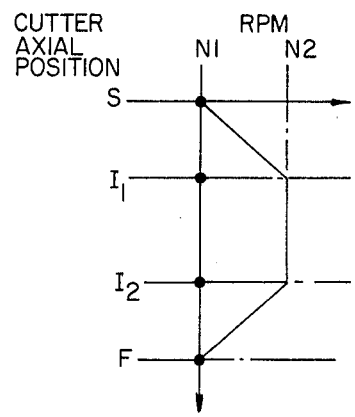
FIG. 3b is a plot showing the change in cutter RPM over the range of cutter positions shown in FIG. 3b.

One kind of RPM variation is the gradual variation that results from change in the degree of engagement between the cutter and workpiece as the cutter moves axially along the workpiece, as shown in FIGS. 3a and 3b. At the start of cutting, position S, the cutting load is at a minimum, and thus the cutter RPM is at its maximum value $N_{MAX}$. As more and more of the cutter engages the workpiece, and the cutting load thereby increases, the cutter RPM decreases. The RPM reaches a minimum $N_{MIN}$ at intermediate position $I_1$, where the cutter reaches maximum engagement with the workpiece. The load and RPM then remain relatively constant until the cutter reaches second intermediate position $I_2$, after which the amount of engagement begins to decrease. From position $I_2$ to the finish position F, where full disengagement occurs, the cutter RPM increases, until regaining its maximum value $N_{MAX}$. In prior art machines, the impact of this gradual variation in cutter RPM is a gradual error in the circumferential location of the gear teeth, something known as lead error L, as diagrammatically illustrated in FIG. 4. The lead error L is given by the expression $$L=(N_{MAX}-N_{MIN})\pi mgT/60$$

where m is the module of the workpiece (i.e., the ratio of pitch diameter to number of teeth), g is the number of hob starts, and the other variables are those defined above.

Figure 5:
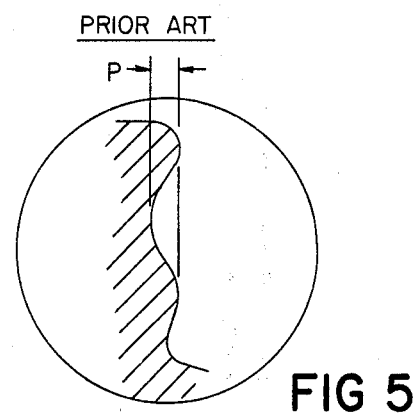
FIG. 5 is a diagrammatic enlarged sectional view of the edge of one tooth at the location labelled 5 on FIG. 4, showing the profile error resulting with prior art machinery.

A second kind of RPM variation is the fluctuation in cutter RPM that occurs during each revolution of the cutter as the result of differences in the stock removal rate of the different teeth on the cutter. Illustrated in FIG. 6a, these fluctuations can be quantified as a peak-to-peak percentage change F. The same fluctuation occurs in the workpiece RPM, but in prior art machines the fluctuation is delayed by period T, as illustrated in FIG. 6b. The resulting phase difference between the cutter and workpiece fluctuations produces a fluctuating error in the shape of the teeth being cut. The fluctuating error is a maximum if the phase difference is 180° (i.e., if period T is one half of the period S of one cutter revolution). This type of error does not affect overall teeth locations as does lead error, but instead produces a waviness in the teeth, something known as profile error P, as diagrammatically illustrated in FIG. 5, which is an enlarged diagrammatic view of one of the teeth of FIG. 4. The profile error P is given by the expression $$P = KF\pi mg/100$$

where K is a coefficient varying from 0 to 2 and dependent on the above-mentioned phase difference and the other variables are those defined above.

Both embodiments correct for these lead and profile errors by delaying or advancing the command signal with respect to the cutter rotation signal and the axial translation signal. In the first preferred embodiment this takes the form of further delaying the response of the workpiece by an additional delay period U chosen such that the total delay between workpiece and cutter is, at least approximately, always the period S of one cutter revolution. The additional delay period U is found using the expression $$U = S - T.$$

In angular terms, this means that the workpiece always lags behind its ideal position by the angle corresponding to one turn of the cutter. In the typical case in which the workpiece advances by one tooth for each turn of the cutter, it means that the workpiece is always out of position by one tooth.

This constant angular error is harmless. Lead error does not occur because the variation in average RPM (FIG. 3b), which caused the error, is dealt with by compensating variation in delay period U, keeping the total delay equal to one revolution period S. Profile error is for all practical purposes eliminated because, as illustrated in FIGS. 6c and 6d, the effect of this delay U is to maintain a constant 360° phase difference between the RPM fluctuations of the cutter and workpiece (the difference between FIGS. 6a and 6d), i.e., the RPM fluctuations during any given turn of the cutter are applied to the workpiece during the next revolution of the cutter. This virtually eliminates profile errors caused by such fluctuations because RPM fluctuations, though gradually changing in character over the full cutting interval, do not change significantly from one cutter revolution to the next.

Delay period U is frequently recalculated during the cutting operation by software 50. The software monitors cutter encoder output C to provide updated estimates of the time period S for a single cutter revolution. The delay time period U is calculated from these estimates, by subtracting a fixed estimate of delay period T, and is supplied to delay circuit 42.

In the second preferred embodiment, which is presently preferred over the first because of its simplicity, software 50 is replaced by software 52, which computes, in advance of cutting, an average delay period $U_0$ from a sample of encoder output C taken while the cutter rotates free of the workpiece. The average delay period $U_0$ is used by delay circuit 42 throughout cutting. Profile error is dealt with somewhat less effectively than with the first embodiment because the phase difference between cutter and work spindle fluctuations is not always exactly one cutter revolution. It is only exactly that when cutter RPM is equal to the average RPM used to compute $U_0$.

Lead error is, however, dealt with just as effectively as in the first embodiment, but in a different manner. Because the delay introduced by delay circuit 42 is fixed, any variation in cutter RPM will cause lead error without some other correction. The needed additional correction in this embodiment comes from software 54, which provides correcting pulses $P_4$ to the pulse composer 46, which uses them to advance or retard the command signal and, in turn, the angular position of the workpiece with respect to the cutter by an amount to compensate for the difference between the current RPM value N and the initial RPM value $N_0$.

Pulse composer 46 advances the workpiece by inserting extra pulses (each of which commands a small angular change of workpiece servometer 22) into the stream of pulses emanating from synchronizing circuit 44 for each pulse $P_4$ of one polarity, and the composer delays the workpiece by eliminating some of the pulses emanating from circuit 44 for each pulse $P_4$ of the other polarity. In terms of circumferential distance $\Delta$ along the workpiece, the advancement of retardation effected by pulse $P_4$ can be expressed as $$\Delta = (N_0 - N)\pi mg(U_0 + T)/60.$$

In both preferred embodiments, software 56 processes feed encoder outputs F, D to provide correction pulses $P_3$ to pulse composer 46 when cutting helical gears. These pulses, which are similar in function to pulses $P_4$ in that they advance or retard the workpiece, provide corrections for the cutting errors due to variation in axial feed velocity, which occur during starting and stopping of the feed screw and during reversals in feed direction (which take place when double cutting gears). Cutting errors from fluctuations in axial velocity are negligible in ordinary circumstances, and are thus not corrected.

Other embodiments of the invention are within the following claims. For example, delay circuit 42, for correcting errors due to cutter RPM fluctuations, could be eliminated, leaving only software 54 used to correct lead error, or the function of the delay circuit could be accomplished with additional software and memory within microcomputer 34, which would supply an additional pulsed output to pulse composer 46.

What is claimed is:

1. Apparatus for controlling synchronism between a rotating cutter and a rotating workpiece of a gear cutting machine, said apparatus comprising means for receiving a cutter rotation signal representing rotation of said cutter, and workpiece synchronizing means for processing said cutter rotation signal to provide a command signal for driving said workpiece, said synchronizing means comprising a timing means for delaying or advancing in time the influence of said cutter rotation signal on said command signal by an amount which is dependent upon a predetermined estimate of a workpiece delay time and which is selected to reduce synchronism errors due to said delay time, said workpiece delay time being the delay between application of said command signal and the corresponding movement of said workpiece.

2. The apparatus of claim 1 wherein said apparatus further comprises means for processing said cutter rotation signal to provide an estimate of the variation in cutter rotation rate, and said timing means comprises means for making said amount of delay or advance dependent upon said estimate of the variation in cutter rotation rate.

3. The apparatus of claim 1 or 2 wherein said machine translates said cutter axially along said workpiece, said apparatus further comprises
   means for receiving an axial translation signal representing axial translation of said cutter along said workpiece and
   means for processing said axial translation signal to provide an estimate of the variation in axial translation rate, and said workpiece synchronizing means further comprises
   means for processing said axial translation signal to provide said command signal and
   a second timing means for delaying or advancing in time the influence of said axial translation signal on said command signal by an amount which is dependent upon said predetermined estimate of workpiece delay time and said estimate of the variation in axial translation rate.

4. The apparatus of claim 3 wherein
said cutter rotation signal consists of a first stream of pulses, each said pulse corresponding to an incremental rotation of said cutter,
said workpiece synchronizing means comprises means for generating from said first stream of pulses a second stream of pulses which form at least a component of said command signal, the number of said second pulses being related to the number of said first pulses by a predetermined ratio dependent on the gear being cut, and
said first-mentioned timing means comprises means for delaying or advancing said second pulses so as to shift the times at which said pulses have an effect on said command signal.

5. The apparatus of claim 4 wherein
said axial translation signal consists of a third stream of pulse, each said pulse corresponding to an incremental translation of said cutter,
said workpiece synchronizing means comprises means for generating from said third stream of pulses a fourth stream of pulses which form a second component of said command signal, the number of said fourth pulses being related to the number of said third pulses by a predetermined ratio dependent on the gear being cut,
said second timing means includes means for delaying or advancing said third pulses so as to shift the times at which said pulses have an effect on said command signal, and
said apparatus further comprises a pulse composing means for combining said second and fourth pulse streams to generate said command signal.

6. The apparatus of claim 1 wherein said timing means comprises delay means for delaying said command signal by a delay period U given by the expression $$U = S - T$$

where S is the time period of one or more full revolutions of said cutter and T is said workpiece delay time.

7. The apparatus of claim 6 further comprising means for recalculating delay period U at a plurality of different times during cutting of a gear and means for determining cutter revolution period S for each new calculation from a current sample of said cutter rotation signal, whereby compensation is provided for change in the rate of rotation of said cutter, and thus change in time period S, during the cutting operation.

8. The apparatus of claim 6 further comprising means for determining as delay period U an average delay period $U_0$ for use throughout the cutting of a gear, and means for determining an average value for time period S from a sample of said cutter rotation signal taken prior to cutting of the gear.

9. The apparatus of claim 7 or 8 wherein
said cutter rotation signal consists of a first stream of pulses, each said pulse corresponding to an incremental rotation of said cutter,
said workpiece synchronizing means comprises means for generating from said first stream of pulses a second stream of pulses which make up at least a component of said command signal, the number of said second pulses being related to the number of said first pulses by a predetermined ratio dependent on the gear being cut, and
said delay means includes means for delaying by delay period U said second pulses so as to delay the effect of said cutter rotation signal on said command signal.

10. The apparatus of claim 9 wherein said delay means comprises a memory means for storing said first or second stream of pulses, or a stream of pulses derived therefrom, for the duration of said delay period.

11. The apparatus of claim 2 wherein said timing means comprises means for delaying or advancing said command signal by an amount corresponding to a circumferential distance $\Delta$ along the workpiece given by the expression $$\Delta = (N_0 - N)\pi m g T / 60$$

where $(N_0 - N)$ represents said estimate of variation in cutter rotation rate, m is the module of the gear being cut, g is the number of hob starts, and T represents said workpiece delay time plus any additional delay introduced by said apparatus.

12. The apparatus of claim 8 wherein said apparatus further comprises
means for processing said cutter rotation signal to provide an estimate of the variation in cutter rotation rate and
said timing means comprises means for making said amount of delay or advance dependent upon said estimate of the variation in cutter rotation rate, and
said timing means comprises means for delaying or advancing said command signal by an amount corresponding to a circumferential distance $\Delta$ along the workpiece given by the expression $$\Delta = (N_0 - N)\pi m g (U_0 + T)/60$$

where $(N_0 - N)$ represents said estimate of variation in cutter rotation rate, m is the module of the gear being cut, g is the number of hob starts, $U_0$ represents said average delay period introduced by said delay means, and T represents said workpiece delay time.

13. The apparatus of claim 4 wherein said first-mentioned timing means comprises
means for generating a fifth stream of pulses from said estimate of variation in cutter rotation rate, each pulse in said fifth stream corresponding to an incremental advance or retardation of said workpiece and
pulse composing means for combining said second and fifth streams as part of generating said command signal, said pulse composing means including means for inserting one or more additional pulses into said second stream upon the occurrence of a fifth-stream pulse corresponding to an advancement and for deleting one or more of said second-stream pulses upon the occurence of a fifth-stream pulse corresponding to a retardation.

14. The apparatus of claim 13 wherein said means for generating said fifth stream includes means for providing that the net advancement or retardation produced by said fifth stream, in terms of circumferential distance $\Delta$ along said workpiece, is given by the expression $$\Delta = (N_0 - N)\pi m g T/60$$

where $(N_0 - N)$ represents said estimate of variation in cutter rotation rate, m is the module of the gear being cut, g is the number of hob starts, and T represents said workpiece delay time plus any additional delay introduced by said apparatus.

* * * * *